March 4, 1941.　　A. H. WINKLER ET AL　　2,234,015
ENGINE STARTER CONTROL
Filed April 14, 1939　　4 Sheets-Sheet 1
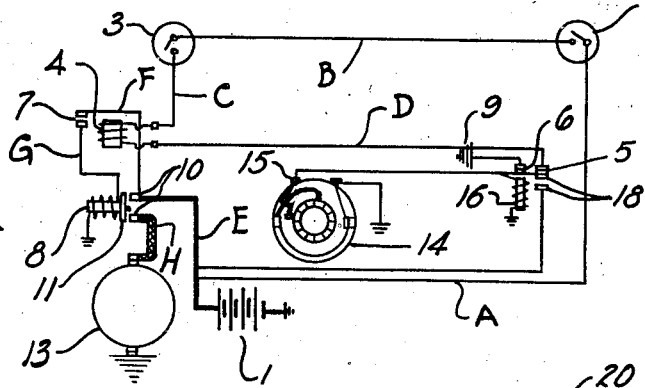
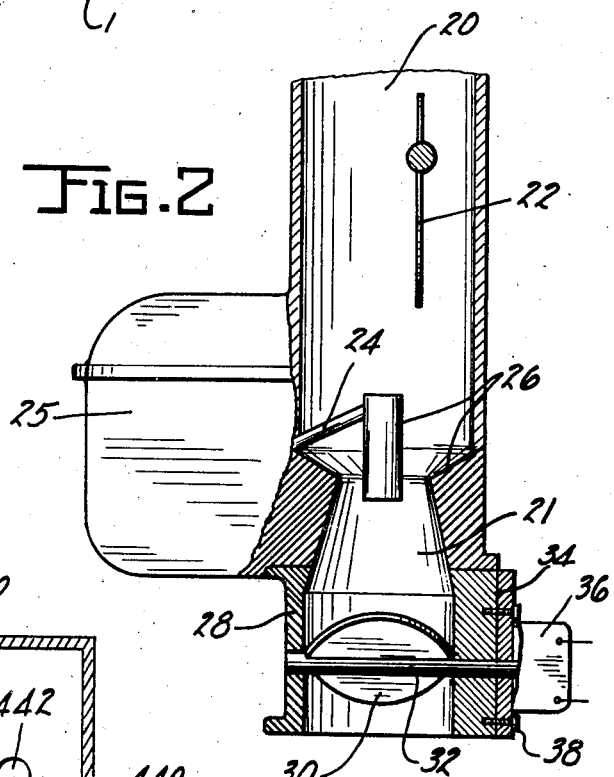
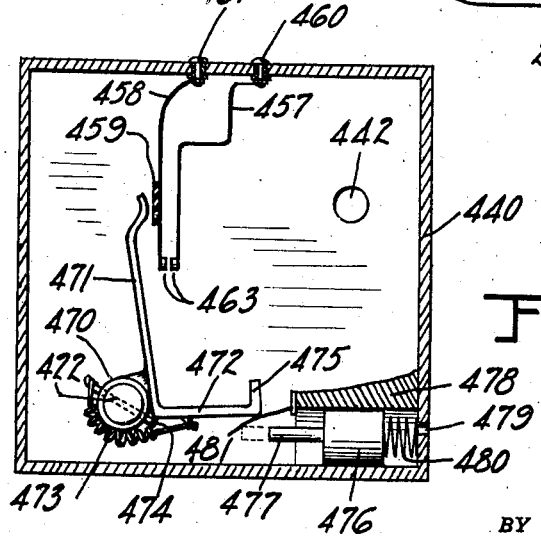
INVENTOR.
ALBERT H. WINKLER
EMIL O. WIRTH
BY A. R. McCrady
ATTORNEY.

March 4, 1941.　　A. H. WINKLER ET AL　　2,234,015
ENGINE STARTER CONTROL
Filed April 14, 1939　　4 Sheets-Sheet 2
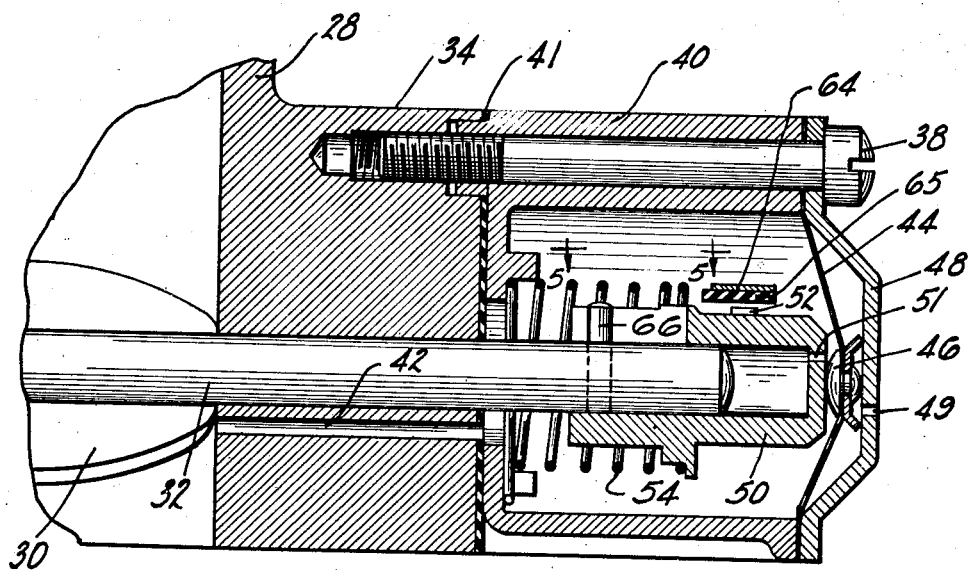
FIG.3
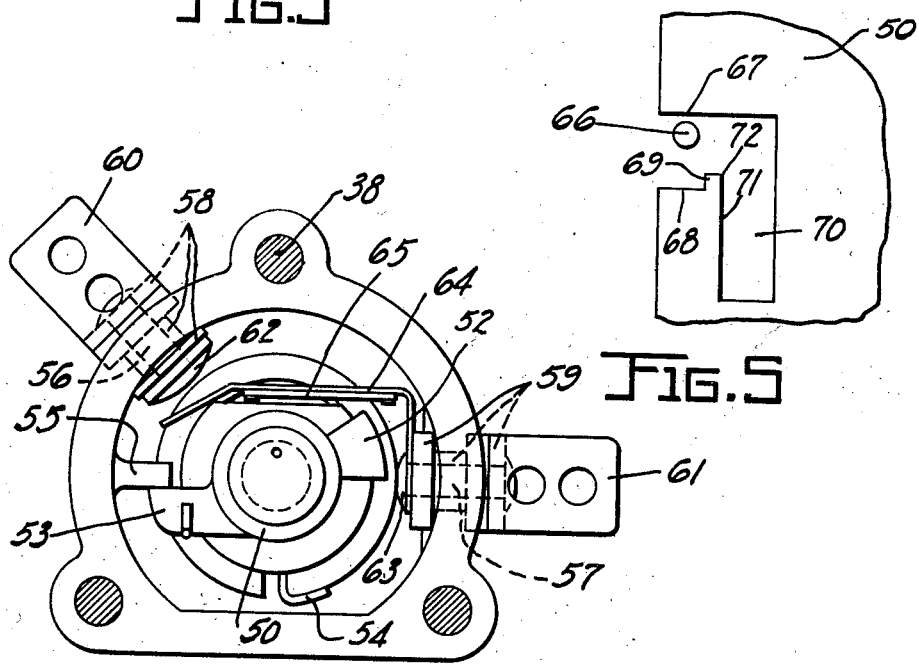
FIG.4
FIG.5
INVENTOR.
ALBERT H. WINKLER
EMIL O. WIRTH
BY A. R. McCrady
ATTORNEY.

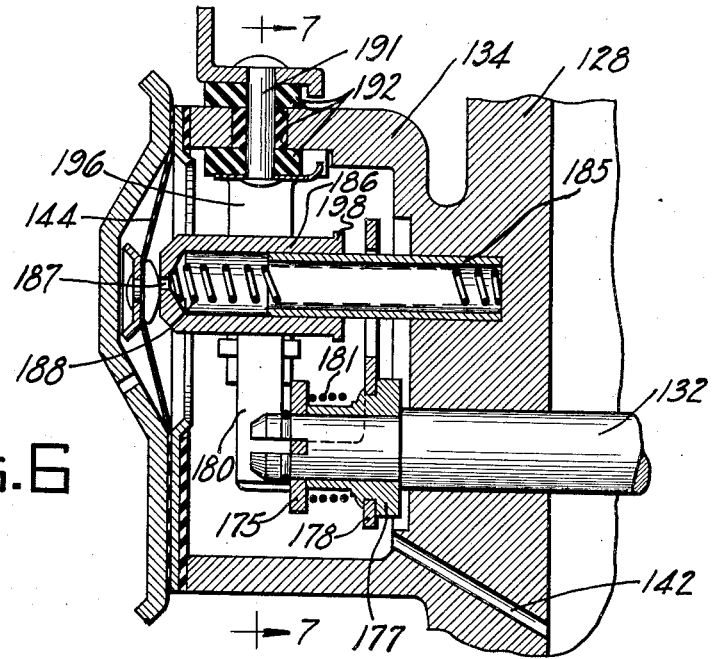
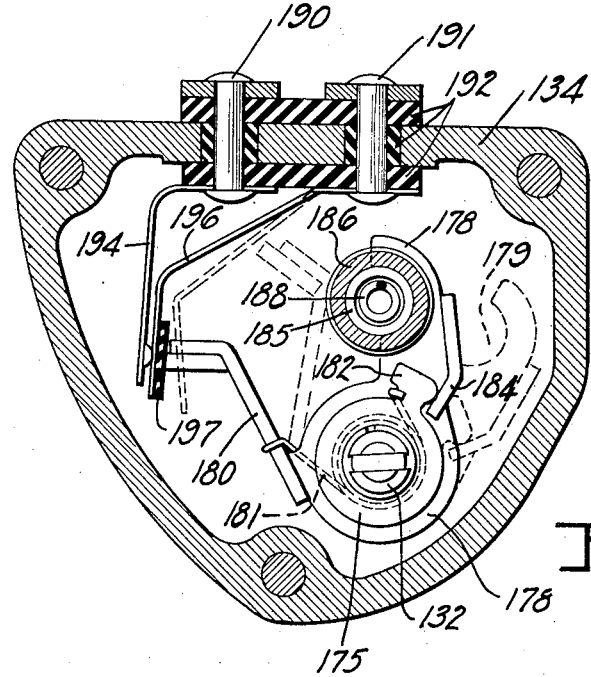

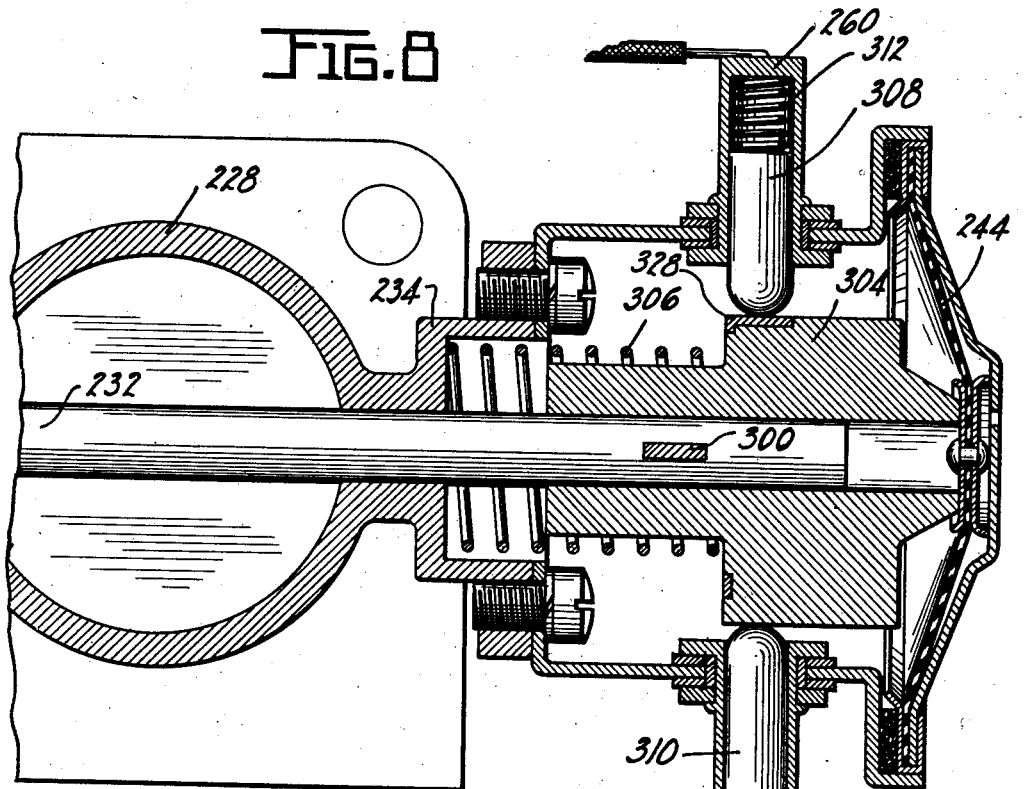
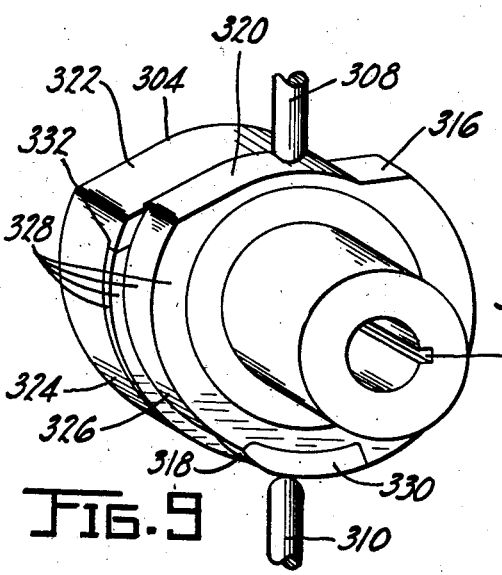
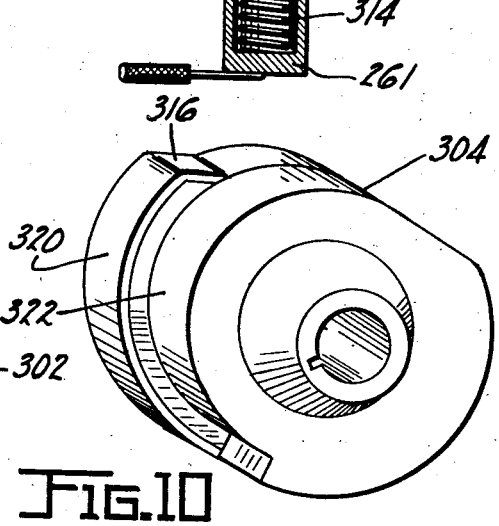

Patented Mar. 4, 1941

2,234,015

UNITED STATES PATENT OFFICE 2,234,015

ENGINE STARTER CONTROL

Albert H. Winkler and Emil O. Wirth, South Bend, Ind., assignors to Bendix Aviation Corporation, South Bend, Ind., a corporation of Delaware Application April 14, 1939, Serial No. 267,783

9 Claims. (Cl. 200—59)

This invention relates to starting apparatus for internal combustion engines, and particularly for engines used in motor vehicles.

Starting arrangements in which the device of the present invention is adaptable for use are generally referred to as "semi-automatic." In arrangements of this type the starting motor is rendered operative upon the closing of the ignition switch and a second switch operable by one of the ordinary control devices of the vehicle such as the clutch or accelerator pedal, and rendered inoperative by a switch opened in response to engine vacuum developed when the engine begins to operate under its own power.

It has been found difficult in the past to provide a sufficiently sensitive suction operated switch which would remain open under certain operating conditions when the intake manifold vacuum is practically negligible, such as at very low speed with the throttle open, and yet would remain closed in opposition to the vacuum created by cranking, or under starting conditions when the engine fires a few times and then ceases firing.

An object of the present invention is to provide starting control means which will maintain the starting motor in operation during the cranking or starting period.

Another object of the invention is to provide means for preventing energization of the starting motor under all possible operating conditions of the engine.

Another object of the invention is to provide means associated with the accelerator pedal for controlling the starting operation. Such association proves of convenience to the average driver at times when the engine stalls while being operated in traffic.

Another object of the invention is to provide a starting control means located immediately adjacent the engine carburetor to eliminate the use of additional operating links or vacuum lines and thereby reduce the number of parts to a minimum.

Still another object of the invention is to provide a simple but dependable starting control means which can be manufactured at very moderate cost.

Other objects and advantages of the invention will be apparent to those skilled in the art from the following description or may be ascertained from a study of the accompanying drawings in which several modifications of the invention have been shown. It will be evident that the principles of the invention may be incorporated in various forms and we contemplate the employment of any structures, arrangements, or modes of operation that are properly within the scope of the appended claims.

Figure 1 is a wiring diagram of an electrical circuit which can be used in conjunction with the engine starter control device of the invention;

Figure 2 is a view, partially in section, showing the general arrangement for attaching the starting control unit to a conventional carburetor;

Figure 3 is a vertical section taken through one form of the starting control unit;

Figure 4 is a right side view of the control unit of Figure 3 with the diaphragm and cover plate removed;

Figure 5 is a development of a slot in the control unit rotor as it would appear if viewed from the top as indicated by the line 5—5 in Figure 3;

Figure 6 is a vertical section through a modified form of the control unit;

Figure 7 is a sectional view taken on the line 7—7 of Figure 6;

Figure 8 is a horizontal section through a further modification of the invention;

Figures 9 and 10 are perspective views of the commutator of Figure 8 as viewed from the left and right respectively;

Figure 11 shows, in diagrammatic form, another modification of the invention.

The wiring diagram of Figure 1 is shown with the various elements in their respective positions previous to the starting operation. Several co-operating circuits are provided, including an ignition circuit which includes a grounded storage battery 1 from which current flows through lead A to ignition switch 2, thence through lead B to the starting control unit switch 3, thence through lead C to the winding of a solenoid relay 4, thence through lead D to contacts 5 and 6 and to ground at 9. Completion of this circuit, by closing the ignition switch in the conventional manner and the starting control unit switch in a manner presently to be described, energizes the relay 4 which closes the switch 7 and completes a second circuit including the battery, leads E and F, switch 7, lead G, and the winding of a solenoid 8, connected to ground. Energization of the solenoid 8 completes the main starting motor circuit, by joining the contacts 10 through bar 11. Current then flows from battery 1 through lead E and cable H to the starting motor 13, which is energized in the conventional manner for starting the engine.

Once the engine has started, assuming the starting control unit switch is maintained in a closed position, the starting motor will remain in engagement and continue to operate until the engine attains a speed at which the generator 14 is charging. Current is then delivered from the generator terminal 15 and through the winding of a cut-out relay 16. The relay 16 operates to break the contacts 5 and 6 and at the same time close contacts 18 thereby to complete a circuit from the generator to the battery. The breaking of the original circuit at points 5 and 6 will, in an obvious manner, result in a breaking of the main starting motor circuit. If the starting control switch is opened immediately after the engine starts but previous to its attaining a speed necessary to obtain a delivery of current from the generator, it is obvious that the starting motor circuit would also be broken and the starter allowed to disengage in the conventional manner.

Figure 2 shows, in a general way, a conventional carburetor having an air inlet 20, a mixture passage 21, a choke valve 22, a fuel nozzle 24 delivering fuel from a fuel supply chamber 25 into primary and secondary venturis 26, and having a throttle body 28 controlled by the throttle valve 30 mounted on the throttle shaft 32. A boss 34 is preferably provided on the throttle body to facilitate the attachment thereto of the control unit, generally referred to by the numeral 36, by means of bolts 38.

One embodiment of the invention is shown in Figures 3, 4 and 5 in which the control body 40 is attached to the boss 34 of the throttle body 28 and is spaced therefrom by a gasket 41 to prevent leakage of external air into the control body. A passageway 42 connects the interior of the control body with the mixture passage at a point posterior to the throttle valve 30. A diaphragm 44, provided with a metallic button 46 merely for wear resistance, seals the end of the control chamber and is held in fluid-tight relation with the body 40 by means of a cap 48 and bolts 38. A vent 49 in the cap prevents air cushioning.

A hollow cylindrical cup-shaped rotor 50 is carried on the extension of the throttle shaft 32 and is rotatable as well as axially slidable thereon. A vent 51 is provided in the end of the cup to prevent air cushioning. The rotor 50 is provided with two radial lugs 52 and 53. A spring 54 connected between the body 40 and the lug 53 serves both as a compression spring tending to force the rotor 50 to the right in Figure 3 and also as a torsion spring tending to rotate the cup 50 in a clockwise direction in Figure 4 to yieldingly urge the lug 53 against a stop 55 formed on the inner surface of the body.

Electrical terminals 56 and 57 extend through the walls of body 40 and are insulated therefrom as indicated at 58 and 59. At their outer ends the terminals are provided with flanges 60, 61 adapted to be connected to leads B and C. At their inner ends the terminals are provided with rounded contacts 62, 63, the latter of which carries a spring clip 64 which has an insulating strip 65 attached thereto and arranged to be contacted by the lug 52 upon rotation of rotor 50 under certain conditions thereby to cause the outer end of clip 64 to engage contact 62 to close the ignition circuit.

The rotor 50 has a slot cut in its periphery having a configuration as shown in the development of the rotor in Figure 5.

A pin 66 is mounted in the shaft 32 and extends therefrom to engage the slot in rotor 50.

The pin and slot are shown in Figure 5 in their relative positions at a time when the engine is stopped and the throttle is closed. It should be noticed that in Figure 5 the pin 66 moves downwardly with opening movement of the throttle and the rotor moves to the left under the action of vacuum on the diaphragm. The operation for starting then is as follows: The ignition switch 2 is closed and the accelerator pedal depressed, thus opening the throttle, pin 66 thereby moving in the slot from adjacent the surface 67 to a point where it contacts the opposite surface 68. Further opening of the throttle rotates the cup 50 in opposition to torsional force of the spring 53 and causes lug 52 to engage the strip 65 and deflect the spring clip 64, thus completing the ignition circuit. The starting motor is thereby energized as explained above. As soon as the engine starts, the manifold vacuum created below the throttle is transmitted through port 42 to the diaphragm 44, which tends to move the rotor to the left. If the throttle is maintained in an opened position the pin 66 engages the projection 69 formed in the slot and prevents the rotor from moving to the left sufficiently to allow the lug 52 to move axially clear of the strip 65.

This stop arrangement is provided so that the starting motor may be maintained in operation during starts when the engine fires a few times and then ceases firing. Such starts are sometimes experienced in cold weather or at times when the engine is flooded. The manifold vacuum created during this limited firing period might otherwise be sufficient to operate the control unit to break the circuit and an undesirable series of rapid engagements and disengagements of the starting motor would result.

Upon closing movement of the throttle, after the engine starts, the rotor 50 and lug 52 are rotated by the torsional force of spring 54 to disengage the lug from the strip 65, thus opening the circuit. Additional closing movement of the throttle moves the pin 66 clear of the projection 69 and allows the rotor 50 to move to the left under the action of the manifold vacuum. The pin 66 is thus brought into a position adjacent that portion of the slot indicated by 70 and the lug 52 is axially moved clear of strip 65. Subsequent opening and closing movements of the throttle merely reciprocates the pin in the portion 70 of the slot and does not rotate the rotor 50 relative to the control body.

If, while the engine is idling or operating under light load, the throttle is suddenly opened, the manifold vacuum is destroyed and the rotor tends to move to the right toward a position which would cause the starting motor to be energized. Such action is prevented by the fact that pin 66 is brought into the portion 70 of the slot simultaneously with the opening of the throttle and the rotor is thereby prevented from moving to the right by contact of the pin 66 with the surface 71 of the slot 70.

The force of spring 54 in compression and the location of the corner 72 of the slot are so adjusted that during normal or even extreme operating conditions the throttle is opened to a point at which pin 66 is beyond the corner 72 at any time the manifold vacuum acting on diaphragm 44 is sufficiently low to allow the rotor 50 to move to the right.

In the form of the invention shown in Figures 6 and 7, the throttle shaft 132 has a hub 175 rigidly attached thereto. A rotor 177 having laterally and angularly displaced levers 178 and 180 attached thereto is rotatably mounted on the throttle shaft. A torsion spring 181 acts between hub 175 and rotor 177 yieldingly urging the rotor in a counterclockwise direction in Figure 7 against a stop extension 182 provided on the hub 175 and arranged to contact a lateral extension 184 from the lever 178. The lever 178 has an arcuately shaped portion adjacent its end as indicated at 179.

A hollow pin 185 mounted in the throttle body is so spaced from the throttle shaft as to cooperate with the arcuate portion of the lever 178. Pin 185 carries a cylindrical cup 186 slidably mounted thereon. An aperture 187 is provided in the end of the cup to prevent air cushioning. The radius of the pin 185 and the external radius of the cup 186 are respectively less than and greater than the radius of curvature of the lever portion 179. A compression spring 188 urges the cup 186 to the left into contact with the diaphragm.

Electrical terminals 190 and 191, insulated from the body 134 by pieces of insulating material 192, are connected to spring-like strips 194 and 196 which in their free position are spaced apart. A strip of insulating material 197 attached to the strip 196 is arranged to be contacted by the lever 180 under certain conditions, thereby moving strip 196 into contact with strip 194 to complete the circuit.

The operation for starting is as follows: The ignition switch 2 is closed and the accelerator pedal depressed thereby opening the throttle. Rotor 177 and its attached levers 178 and 180 move counterclockwise in Figure 7 under the action of the torsion spring 181 until extension 180 engages the strip 197 and completes the electrical circuit previously explained. During this operation lever 178 moves to a position where the curved portion 179 is immediately adjacent the curved surface of pin 185. Further movement of rotor 177, upon additional opening of the throttle, is prevented by contact between the lever 178 and pin 185. The throttle, however, is allowed to move further open by the overrunning action of the torsion spring 181 cooperating with the free-floating lever 178.

Once the engine starts, vacuum transmitted through the passage 142 acts on the diaphragm 144 urging it and the cup 186 to the right. If the throttle is maintained in an open position, movement of the cup to the right is prevented by the lever 178. If the throttle is now closed the lever 178 moves clear of the pin 185 and allows the cup to move to the right. Upon a subsequent opening of the throttle to a point slightly beyond an idling position the lever 178 engages the cup 186 and prevents the rotor 177 and its extension 180 from moving to a position which would close the contacts. An annular extension 198 is provided on the cup 186 and engages the lever 178 to prevent the cup moving to the left under the action of spring 188 at such times as the throttle is open and the manifold vacuum is subsequently decreased.

In the modification shown in Figures 8, 9 and 10, the throttle shaft 232 is provided with a key 300 freely cooperating with a spline 302 in the bore of the commutator body 304. The member 304 is thus allowed to freely slide axially on the shaft 232 but is confined to rotate with the shaft. The member 304 is urged to the right by compression spring 306 and to the left by the diaphragm 244 in response to suction transmitted to the interior of the control body from a point in the mixture passage posterior the throttle.

The external terminals 260 and 261 contain slidable contacts or brushes 308 and 310 urged inwardly against the surface of the commutator 304 by springs 312 and 314. The commutator, shown in perspective in Figures 9 and 10, is made of a non-conductive material, such as Bakelite, and is formed with an outwardly extending ramp 316 and an inwardly extending ramp 318. The ramp 316 is of greater extent than the ramp 318 thereby forming a pronounced step between the surface 320 of the ramp and the surface 322 of the commutator as contrasted to a moderate step between the surfaces 324 and 326. A metallic commutator strip or segment 328, fabricated to conform to the contour of the aforementioned ramps, has an active contact surface which extends entirely around the commutator except for a portion indicated at 330 at which the contact surface has been supplanted by an extended portion of Bakelite. The insulated portion 330 is so located as to be in contact with the brush 310 when the throttle is closed. The commutator segment has an outwardly extending radial flange through that portion of the circumference corresponding to the step between surfaces 324 and 326. The Bakelite commutator is molded with a recess to receive this flange as is indicated at 332. The metallic flange is provided to increase the wear resistance of this step against action of the brush 310 as will be described.

Previous to starting, the commutator is in the position shown in Figure 8. Brush 308 is in contact with the commutator segment 328 and brush 310 is in contact with the insulated portion 330. The position of the brushes with respect to the ramps is as shown in Figure 9. It should be noted that the commutator as shown in Figure 9 turns counterclockwise with an opening of the throttle.

As the throttle is opened, with the ignition switch closed, the brush 308 slides up the ramp 316 and brush 310 slides down the ramp 318. Further opening of the throttle causes brush 310 to slide onto the metallic commutator strip thus completing the circuit. Once the engine starts, manifold vacuum is transmitted to diaphragm 244 which tends to move the commutator to the left in Figure 8. A slight braking force is created by the action of the brush 310 on the moderate step between surfaces 324 and 326. When the engine is definitely started the manifold vacuum is sufficient to easily move the commutator to the left and cause the hemispherical end of brush 310 to ride over the step from surface 326 to surface 324. The brush 308 drops off the ramp surface 320 onto surface 322 during this movement of the commutator. Both brushes are thus moved from the commutator strip 328 onto the Bakelite hub and the starting circuit is broken.

The step between surfaces 320 and 322 is of sufficient magnitude that brush 308 will positively engage the step and prevent the commutator from moving to the right in Figure 8 at such times as the throttle is open and the manifold vacuum is extremely low.

In the diagrammatically illustrated modification of Figure 11, a control body 440 communicates with the mixture passage at a point posterior to the throttle by means of passage 442. A lever 470 having extensions 471 and 472 is rotatably mounted on the throttle shaft 422 and urged in a clockwise direction by torsion spring 473 against a stop pin 474 mounted in the shaft 422.

The extension 472 is bent adjacent its end as indicated at 475.

Two electrical terminals 460 and 461 have metallic spring-like strips 457 and 458 attached thereto. In the undeflected position of the strips the contact points 463 are spaced apart. A strip of insulating material 459 is attached to member 458 and is arranged to be contacted by the extension 471 of the lever 470 under certain conditions of operation, thereby to close the contacts 463 and complete the circuit.

A piston 476 having an extension 477 is provided in a cylinder 478 which is vented to the atmosphere at 479. The piston is urged to the right by the tension spring 480 and to the left by the vacuum transmitted to the control body through passage 442. A stop 481 is provided to limit the movement of the piston to the left.

The elements of Figure 11 are shown in their respective positions at a time when the throttle is closed and the engine is not operating.

In the starting operation the throttle is opened, turning clockwise in the figure, lever 471 contacts the strip 459 and closes the contacts 463 and lever extension 475 moves into a position which will prevent the piston from moving to the left under the action of manifold vacuum. If the throttle is closed after the engine starts, the lever 475 moves clear of the pin 477 and allows the piston to move to the left against the stop 481.

Upon a subsequent opening of the throttle, the lever 472 contacts the pin 477 and prevents any further rotation of the lever 470 and its extension 471 which otherwise would close the contacts 463. The overrun arrangement obtained by the torsion spring 473 cooperating with the free-floating lever 470 allows the throttle to open even though the lever 470 is restrained by the piston pin extension 477.

It will be understood that many variations can be made from the disclosed embodiments and it is not intended that the scope of the invention shall be limited to the forms shown and described nor otherwise than by the terms of the appended claims.

We claim:

1. In a starting control device for an internal combustion engine including a carburetor throttle shaft, a switch, a rotor mounted on the shaft and slidable relative thereto, a spring urging the rotor in one direction on the shaft, a suction responsive element urging the rotor in the opposite direction on the shaft in opposition to the spring, means associated with the rotor for closing the switch upon throttle opening movement when the rotor has moved to its limit position in said one direction, means to prevent the rotor from closing the switch when the rotor has moved to its limit position in said opposite direction, locking means preventing the rotor from moving from the first mentioned limit position to the second mentioned limit position when the throttle is in an open position, and locking means preventing the rotor from moving from the second mentioned limit position to the first mentioned limit position when the throttle is in open position.

2. In a starting control device for an internal combustion engine including a carburetor throttle shaft, a switch having relatively movable contacts, means carried by the throttle shaft adapted to move one of the switch contacts to close the switch upon opening movement of the throttle, and an engine-suction responsive member operable to prevent the closing of the switch upon opening movements of the throttle at such times as the engine suction is above a predetermined minimum value.

3. In a starting control device for an internal combustion engine including a carburetor throttle body having a throttle shaft, a throttle valve attached thereto for controlling the flow of mixture through said body, a switch directly attached to said throttle body comprising relatively movable contacts, a rotor mounted on an extension of the throttle shaft and movable relative thereto, a spring urging the rotor in one direction on the shaft, a movable wall operable in response to the suction posterior to the valve urging the rotor in the opposite direction on the shaft, a slot in the rotor, a pin in the shaft cooperating with said slot to rotate the rotor with the shaft when the suction posterior the valve is below a predetermined minimum value thereby to close the switch, means including the slot for preventing the closing of the switch when the suction is above said predetermined value, and locking means associated with the slot to prevent opening the switch when the throttle is in an opened position.

4. In a starting control device for an internal combustion engine including a carburetor throttle shaft, a switch, a rotor mounted on an extension of the throttle shaft and movable relative thereto, a slot in the rotor, a pin in the shaft cooperating with the slot, spring means and means responsive to the suction posterior the throttle acting in opposite directions on the rotor thereby to position the rotor and slot relative to the pin, and means associated with the rotor including means for closing the switch upon opening movement of the throttle when the suction is zero, means for preventing the opening of the switch when the throttle is in an opened position, and means for preventing the closing of the switch when the throttle is in an opened position.

5. In a starting control device for an internal combustion engine including a carburetor throttle shaft, a switch, a rotor mounted on an extension of the throttle shaft and movable relative thereto, means associated with the rotor for closing said switch upon rotation of said rotor, a slot in the rotor, a pin in the shaft cooperating with the slot, spring means and means responsive to the suction posterior to the throttle acting in opposite directions on the rotor thereby to position the rotor and slot relative to the pin, means associated with the slot to rotate the rotor when in the spring-urged position upon opening movement of the throttle, and means to prevent such rotation when the rotor is in the suction-urged position.

6. The starting control device of claim 5, together with a locking means associated with the slot to prevent the rotor from moving from the spring-urged position to the suction-urged position when the throttle is opened more than a predetermined amount.

7. The starting control device of claim 5, together with a locking means associated with the slot to prevent the rotor from moving from the suction-urged position to the spring-urged position when the throttle is opened more than a predetermined amount.

8. In a starting control device for an internal combustion engine having a carburetor, a carburetor throttle shaft, a rotor mounted on an extension of the throttle shaft to be rotated thereby, a metallic commutator segment forming a portion of the surface of said rotor, a pair of contacts adapted to engage said commutator segment when the engine is not operating and the throttle is opened to be electrically connected thereby, an insulator forming a portion of the surface of said rotor and adapted to engage one of said contacts when the throttle is closed to interrupt the electrical connection between said contacts, and means including a movable wall responsive to engine suction for preventing the engagement of one of said contacts with the metallic commutator segment when the engine suction is above a predetermined minimum value and the throttle is opened.

9. In a starting motor circuit for an internal combustion engine having a carburetor throttle shaft, a switch comprising a pair of contacts, a rotor mounted on an extension of said throttle shaft to be operated thereby, means forming a portion of said rotor for closing said switch upon throttle opening movement, and means including a movable operable in response to engine suction for preventing the closing of said switch when the suction is above some predetermined value.

ALBERT H. WINKLER.
EMIL O. WIRTH.

CERTIFICATE OF CORRECTION.

Patent No. 2,234,015.  March 4, 1941.

ALBERT H. WINKLER, ET AL.

It is hereby certified that error appears in the printed specification of the above numbered patent requiring correction as follows: Page 5, second column, line 10, claim 9, after "movable" insert --member--; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.